United States Patent [19]
Blanchard et al.

[11] Patent Number: 5,629,929
[45] Date of Patent: May 13, 1997

[54] APPARATUS FOR RAPID INTERFERENCE CANCELLATION AND DESPREADING OF A CDMA WAVEFORM

[75] Inventors: Scott D. Blanchard, Mesa; Kenneth S. Wreschner; Marc D. Brack, both of Chandler; Terry Winningham, Scottsdale, all of Ariz.

[73] Assignee: Motorola, Inc., Schaumburg, Ill.

[21] Appl. No.: 657,576

[22] Filed: Jun. 7, 1996

[51] Int. Cl.$^6$ ............................. H04J 13/00; H04J 11/00
[52] U.S. Cl. ..................... 370/201; 370/210; 370/342; 375/200
[58] Field of Search ............................ 370/18, 19, 22; 375/200, 205, 206, 349

[56] References Cited

U.S. PATENT DOCUMENTS

| | | | |
|---|---|---|---|
| 4,493,080 | 1/1985 | Campbell | 371/37 |
| 4,962,508 | 10/1990 | Kingston | 375/1 |
| 5,363,401 | 11/1994 | Lucas et al. | 375/1 |
| 5,377,223 | 12/1994 | Schilling | 375/1 |
| 5,511,068 | 4/1996 | Sato | 370/18 |
| 5,544,196 | 8/1996 | Tiedemann, Jr. et al. | 375/200 |
| 5,553,062 | 9/1996 | Schilling et al. | 370/18 |
| 5,568,473 | 10/1996 | Hemmati | 370/18 |

OTHER PUBLICATIONS

Pedro M. Crespo, "Spread-Time Code-division Multiple Access", IEEE Transactions on Communication Jun. 1995 v. 43.

Konstandinos G. Filis: "Overlay of Cellular CDMA on FSM", IEEE Transactions On Vehicular tech. Feb. 1994 v. 43.

Stuart D.S.: "Some Alternatives In Transform-Domain Suppression of Narrow-Band Interference . . . ", IEEE Com. Dec. 1995 v. 43.

Takeharu Kohri: "An Interferene Suppressor for CW and Narrow-band Signals using Filter bank on CDMA . . . ", IEEE Sep. 1994.

Primary Examiner—Douglas W. Olms
Assistant Examiner—A. Bnimoussa
Attorney, Agent, or Firm—Bradley J. Botsch, Sr.

[57] ABSTRACT

A receiver performs rapid adaptive interference canceling for use in despreading multiple CDMA channels sharing the same RF front end. The receiver includes a buffer (22) for providing for overlapping time samples and rate adaptation, a windowing function (24) for improving interference rejection capability and a FFT (26) for calculating the input power spectrum. The receiver further includes a circuit (28, 30) to whiten the input power spectrum. The whitened power spectrum is multiplied (32) against the frequency domain version of different spreading sequences and the inverse FFT (40) of the product is performed. The output of this inverse FFT is buffered (44) to provide multiple despread output channels, with a plurality of code phases for further processing.

15 Claims, 3 Drawing Sheets

APPARATUS FOR RAPID INTERFERENCE CANCELLATION AND DESPREADING OF A CDMA WAVEFORM

BACKGROUND OF THE INVENTION

This invention relates to communication receivers and, in particular, communication receivers for despreading multiple CDMA signals in the presence of multiple non-stationary narrow band interference.

Code Division Multiple Access (CDMA) Direct Sequence Spread Spectrum (DSSS) technologies promise to provide significant capacity improvements over analog and other digital communication systems. For these systems to achieve their promised capacity, they are required to adaptively control the power transmitted by each user within tight constraints. Unfortunately, this is not always possible, especially when the frequency band used is either adjacent to or shared by other narrow band systems such as analog or TDMA signals. Since these other users are not part of the CDMA system their power can not be controlled.

This problem is exacerbated by the non-stationary nature of these interfering signals. In a mobile environment rapid fluctuations in power are typically encountered due to the Raleigh and log-normal statistics of the channel. Furthermore, in a TDMA system each timeslot is used by a different user causing rapid fluctuations in received interference power at the TDMA burst rate. Finally, many mobile systems employ discontinuous transmission techniques so that they transmit only when the user is talking, thereby causing the interference to come and go with speech activity.

To operate in such an environment, several techniques may be used. First, all CDMA users can be commanded to transmit more power than would be necessary in the absence of the interference so that after despreading they have sufficient signal quality. This has the disadvantage of reducing the battery life of the portable users, and complicates system planning.

Secondly, adaptive interference techniques may be used. Classical techniques typically suffer from high complexity and often are unable to adapt quickly enough so that some interfering signal energy is still present. Further, these techniques are typically implemented as a front end processor separate from the despreader, and thus do not take full advantage of the properties of the signal.

Hence, what is needed, is a apparatus which does not add significant complexity to the CDMA receiver, but is able to instantaneously adapt to the presence of rapidly changing narrow band interference.

DETAILED DESCRIPTION OF THE DRAWINGS

Figure 1:
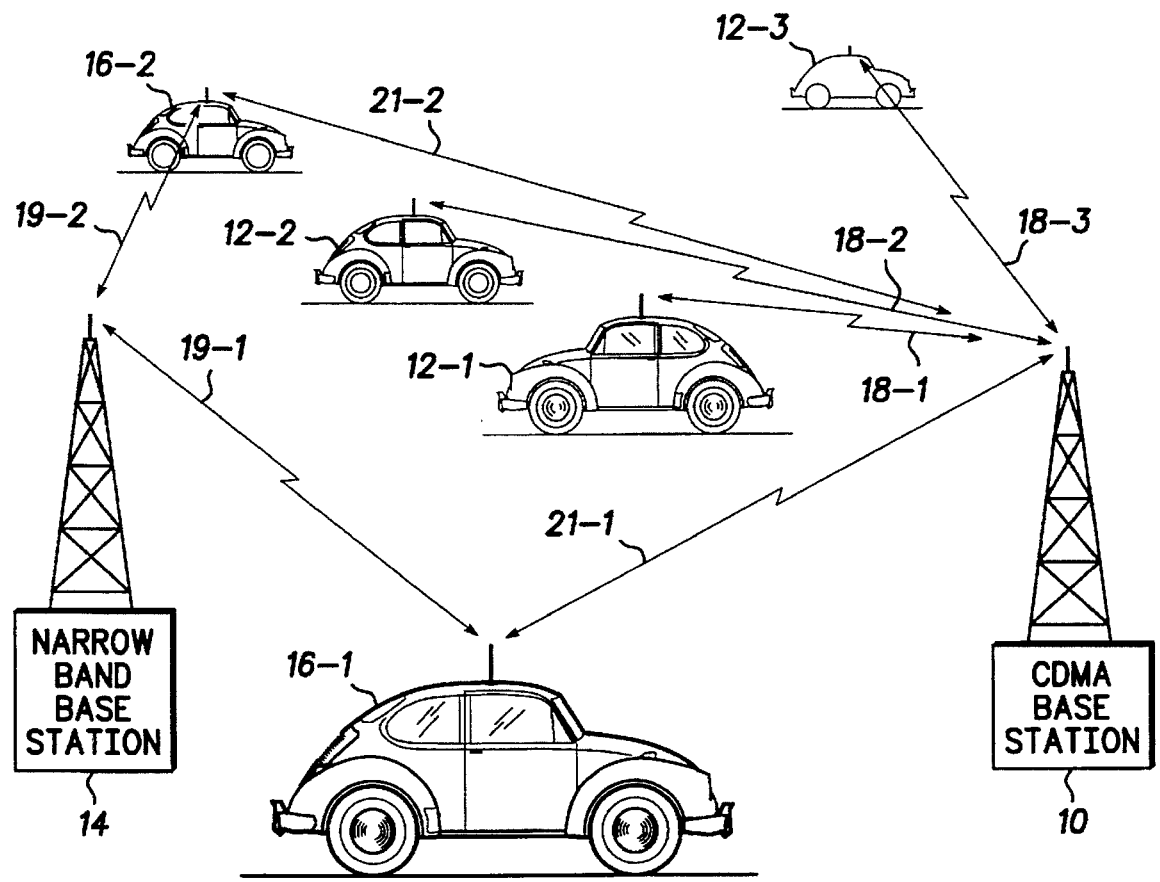
FIG. 1 is a block diagram illustrating a CDMA communication system operating in the presence of narrow band transmitters.

The present invention describes a rapid adaptive interference canceler despreader for despreading multiple CDMA channels sharing the same RF front end. As an example of the type of CDMA signals and interference environment refer to FIG. 1 illustrating two communication systems in use. These two systems share the same frequency band or use adjacent bands. The first system comprises CDMA Base Station 10 which communicates with mobile users 12-1 through 12-3. These users communicate using a CDMA DSSS protocol over radio links 18-1 through 18-3, respectively, and share the same frequency, but use different spreading codes. The CDMA Base Station 10 receives the signals from mobile users 12-1 through 12-3 and uses adaptive power control to adjust the transmitted power from mobile users 12-1 through 12-3 such that each user is received with the same power at CDMA Base Station 10. An example of such a communication system is the IS-95 CDMA cellular standard. The second system comprises Narrow Band Base Station 14 which communicates with mobile users 16-1 and 16-2. These users communicate using a narrow band link 19-1 and 19-2, respectively, using FDMA techniques either with or without TDMA as well. An example of such a system would be the U.S. AMPS cellular standard or the IS-54 TDMA standard. In addition to communicating with Base Station 14, mobile users 16-1 and 16-2 also transmit energy to CDMA Base Station on links 21-1 and 21-2, respectively. Since mobile users 16-1 and 16-2 are not controlled by CDMA Base Station 10, the received power can be quite large at CDMA Base Station 10, degrading the quality of the received signals from mobile users 12-1 through 12-3. This degradation is overcome by the present invention by placing a rapid adaptive interference canceler despreader in CDMA Base Station 10 which will remove the energy from mobile users 16-1 and 16-2 and improve the signal quality for desired users 12-1 through 12-3. In addition to improving reception quality through the application of this invention in CDMA Base Station 10, the required transmitted power form 12-1 through 12-3 is significantly reduced, increasing the battery life of these users radios.

Figure 2:
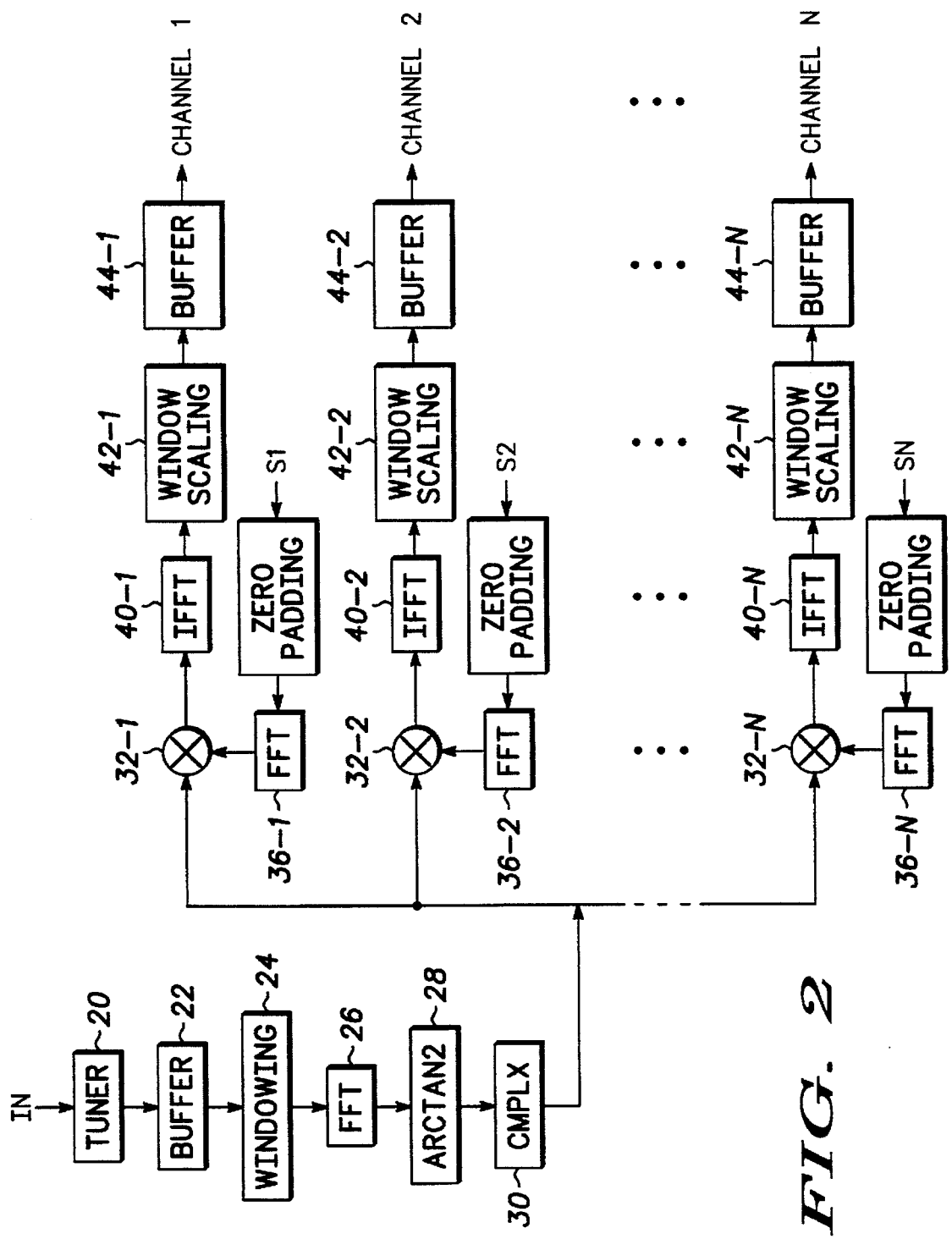
FIG. 2 is a detailed block diagram illustrating a preferred embodiment of the adaptive interference canceler despreader.

Referring to FIG. 2, a detailed block diagram is shown illustrating a preferred embodiment of the adaptive interference canceler despreader for rapidly canceling narrowband interference and despreading multiple CDMA signals. A CDMA signal is applied to an input of tuner 20 whereby tuner 20 converts the frequency of the RF carrier signal associated with the CDMA signal to a more convenient frequency for further signal processing. For example, the input signal applied at the input of tuner 20 may be at a carrier frequency of 875 MHz and tuner 20 may down convert the signal to a more appropriate frequency for further signal processing such as to a carrier frequency near DC so that digital signal processing circuits can readily be implemented. It is noteworth that tuner 20 may not be necessary if the input signal is already at a carrier frequency that is suitable for further processing. In a preferred embodiment the output of tuner 20 is a digitized signal represented by a time series of complex valued samples.

The output of tuner 20 is applied to buffer 22 which is further coupled to windowing block 24. The buffer provides a mechanism to form blocks of samples of the received signal which the despreader correlates against a local reference signal and provides for rate adaptation between how fast the Fast Fourier Transform (FFT) is performed and the tuner output is sampled. The block size is set by both the number of chips of the received signal desired for each block-correlation processing, as well as the number of chips of the local reference signal. At a minimum, the block size should be the maximum of these two numbers. With this minimum, correlation errors due to circular convolution and partial correlation will occur. To eliminate errors of this nature, the block size is increased to a minimum of the sum of number of chips of the received signal and the number of chips of the reference signal desired for the correlation. For example, if the despreader is to correlate 64 chips of the received signal against 16 chips of the local reference, the minimum block size is 64 chips, while the minimum block size to prevent circular convolution and partial correlation errors is 80 chips. Additionally, when the block size is extended beyond the minimum required for the purpose of prevent said errors, successive blocks are formed from overlapping sections of the received signal. The minimum overlap is equal to the amount of extension to the minimum block size. For the previous example, the minimum overlap is 16 chips. Overlaps of fewer chips result in errors due to circular convolution and partial correlation, while overlaps of more chips results in redundant processing.

Windowing block 24 improves the system's ability to excise narrow band interference. Windowing block 24 may take the form of well-known hamming or blackmann-type window function blocks. The selection of the windowing function is selected based upon the spectrum of the expected interference. The better the frequency domain version of the window function matches the narrow band interference spectrum, the better the system will excise the interfering signals.

In a preferred embodiment no windowing is performed and the output of buffer 22 is directly coupled to FFT block 26. This embodiment reduces the complexity of the despreader, while continuing to provide for significant interference rejection capability.

The output of windowing block 24 is supplied to an input of FFT block 26 for performing a fast Fourier transform on its input data, after zero padding in block 25 to extend the block size to the FFT size. Zero padding is used to prevent circular convolution or partial correlation errors when extending the block size determined by the number of chips of received signal and number of chips of local reference to be correlated to the FFT size which is generally a power of two for computational efficiency. Accordingly, FFT block 26 provides at its output the frequency domain representation of the down converted signal from tuner 20. FFT block 26 provides a number of frequency bins, which are a function of the FFT length, whereby if B is the FFT length, then B frequency bins are provided. In a preferred embodiment buffer 22, windowing block 24 and FFT block 26 are implemented using a FIFO, a GEC Plessey (Swindon, UK) 16540 Bucket Buffer and a GEC Plessey 16510 FFT Processor.

For each frequency bin supplied from FFT block 26, arctan2 block 28 and complex block 30 are used to normalize each magnitude bin to a constant while preserving the phase information. Arctan2 block 26 performs a four quadrant inverse tangent function, outputting the angle of complex FFT output signal. Rect block 30 calculates the sine and cosine of this angle, generating a complex number with magnitude of 1 and having the same angle as the signal at the output of FFT block 26. It is understand that by making all frequency bins equal in magnitude, blocks 28 and 30 essentially perform a frequency whitening function and make the magnitude substantially equal for all frequencies. It is further understood that this whitening response changes for each FFT based upon the bin values and, thus, instantaneously adapts to changes in the interference environment. In a preferred embodiment, the FFT block 26 is performed for each received bit, such that this whitening function adapts to a new value for each bit. In a preferred embodiment, arctan2 block 28 is implemented using a GEC Plessey 16330 Pythagoras processor and the complex block 30 is implemented using a GEC Plessey 16340 Polar to Cartesian Converter.

The whitening function performed by block 28 and block 30 may be implemented in numerous other alternate methods including scaling each bin by the inverse of its magnitude using a magnitude calculator and a multiplier. Mathematically, if the output of FFT block 28 is represented a complex number in Cartesian form, i.e., $X-jY$, then any combination of blocks which calculate the result $(X-jY)/sqrt(X^2+Y^2)$, where sqrt is the square root function, will provide equivalent results.

The output of block 30, representing the whitened input spectrum, is coupled to a plurality of multipliers, represented by multiplier 32-1 through multiplier 32-N. Each of these multipliers multiplies the whitened input spectrum by the frequency domain representation of spreading sequences S1 through SN thereby generating a plurality of despread signals at the outputs of multipliers 32-1 through 32-N. The frequency domain sequence is generated by appending zeros to the end of each sequence S1 through SN, via zero padding block 34-1 through 34-N respectively. Zero padding blocks 34-1 through 34-N are coupled to FFT blocks 36-1 through 36-N. Accordingly, this ensures that the length of the FFT computed by blocks 36-1 through 36-N is identical to the length of FFT computed by FFT block 26. Zero padding is used to eliminate errors from circular convolution and partial correlation. In addition, the timing is adjusted such that bin 1 of FFT block 36-1 through 36-N is multiplied by bin 1 of the whitened spectrum in multipliers 32-1 through 32-N. To compute the correlation without circular convolution or partial correlation errors, each sequence S1 through SN should be appended with zeros to produce a block length equal to the number of samples to be correlated against at the input plus the number of code phases. For example, if the multichannel despreader is to correlate against 64 chips of the spreading sequence at a time and 16 code phases are required, the frequency domain spreading sequence is computed by taking the FFT of the sequence of 64 chips followed by at least 16 zeros. A fewer number of zeros can be appended at the expense of adding errors in the calculation due to circular convolution. Additional zeros is often appended in order to generate a block size which is a power of 2 or 4 which is the size of typical commercially available FFT processing hardware. In a preferred embodiment, the frequency domain of the spreading sequence is computed prior to processing and zero padding blocks 34-1 through 34-N and FFT blocks 36-1 through 36-N are replaced with a lookup memory table with inputs selecting sequence number and chip offset.

The output of multipliers 32-1 through 32-N are provided to inverse FFT (IFFT) blocks 40-1 through 40-N respectively for calculating the inverse fast Fourier transform thereof. The length of the inverse FFT is equal to the length of the FFT computed in FFT block 26. Accordingly, this now provides a despread time domain signal. This despread time domain signal includes valid time bins which include correlation values and invalid time bins containing circular convolution data. One skilled in the art can readily determine the valid time bins which do not contain circular convolution data based upon the block size set in buffer 22, the number of chips in the sequence Si, and the FFT block size.

In addition, these bins have non-uniform magnitude due to the windowing performed by windowing block 24. Window scaling block 42-1 through 42-N performs the necessary scaling to normalize these magnitudes and prevent an amplitude modulation response at the output of the despreader, as due to windowing block 24.

Finally, the output of each window scaling 42-1 through 42-N is passed through buffers 44-1 through 44-N, respectively, before being output. Buffers 42-1 through 42-N are used to permit the processing of the despread signal to be performed at a different clock frequency and are also used to discard invalid time bins so that only valid time bins are processed.

In an alternate embodiment which performs no windowing and is implemented without windowing block 24 as previously described, window scaling blocks 48-1 through 48-N are not needed and IFFT blocks 40-1 through 40-N are directed coupled to buffers 42-1 through 42-N respectively.

One of ordinary skill in the art should understand that the despreader shown in FIG. 2 is a multichannel frequency domain implementation of an adaptive matched filter with a very fast response whitening function as provided by arctan2 block 28 and complex block 30. This permits the despreader to operate in the presence of large, non-stationary narrow band interference. This implementation is capable of adapting its filter function for every FFT frame which in a preferred embodiment is a single bit period. During testing, a despreader was able to process a signal with an interference of 50 dB above the signal, although the system had a spreading gain of approximately 23 dB. This permits the despreader to frequency share with other communication systems, including those which have non-stationary statistics such as TDMA systems and mobile radio systems, improving the capacity of the CDMA system and increasing the batter life of portable users.

The output of the despreader shown in FIG. 2 is a plurality of despread channels. Each despread channel provides multiple code phase correlation outputs. This makes the despreader well suited for post processing by a RAKE receiver for optimally combining the energy from each of the code taps. The number of fingers on a RAKE receiver using this invention is typically greater than that used for adapting to a mobile environment. This is due the additional dispersion induced by the whitening function. The multiple despread channels represent received signals from multiple users and/or multiple code sets from the same users such as the walsh code that is used by a IS-95 portable radio uplink.

Figure 3:
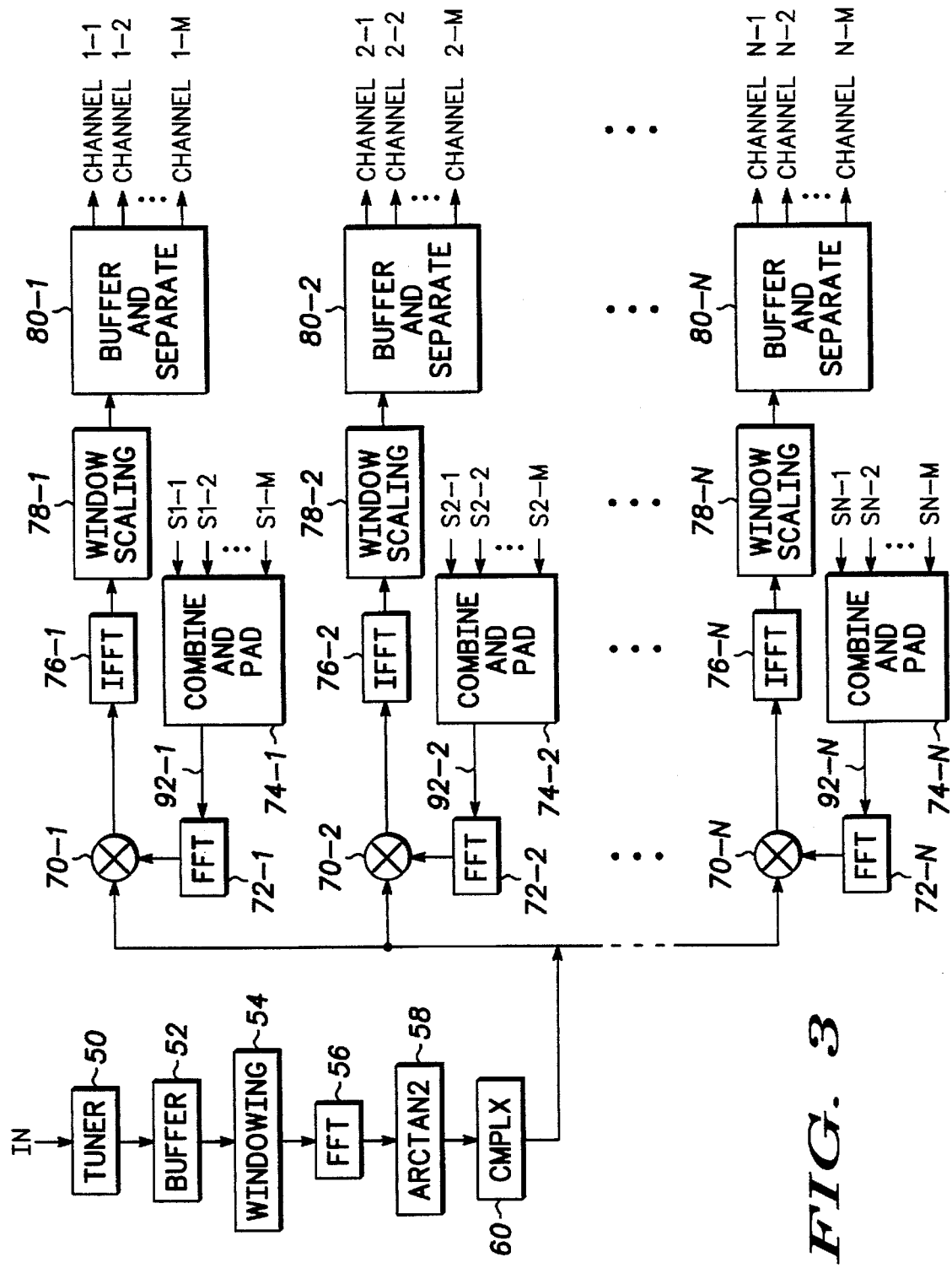
FIG. 3 is a detailed block diagram illustrating an alternate embodiment of the adaptive interference canceler despreader.

Referring to FIG. 3, a detailed block diagram is shown illustrating a alternate embodiment of the adaptive interference canceler despreader for rapidly canceling narrowband interference and despreading multiple CDMA signals. This embodiment reduces the number of FFT and Inverse FFT blocks at the expense of having each block process more data. A CDMA signal is applied to an input of tuner 50 whereby tuner 50 converts the RF signal to a more convenient frequency for further signal processing. For example, the input signal applied at the input of tuner 50 may be at a carrier frequency of 875 MHz and tuner 50 may down convert the signal to a more appropriate frequency for further signal processing such as to a carrier frequency near DC so that digital signal processing circuits can readily be implemented. It is noteworth that tuner 50 may not be necessary if the input signal is already at a carrier frequency tat is suitable for further processing. In a preferred embodiment the output of tuner 50 is a digitized signal represented by a time series of complex valued samples.

The output of tuner 50 is applied buffer 52 coupled to windowing block 54. The buffer provides a mechanism to form blocks of samples of the received signal which the despreader correlates against a local reference signal and provides for rate adaptation between how fast the Fast Fourier Transform (FFT) is performed and the tuner output is sampled. The block size is set by both the number of chips of the received signal desired for each block-correlation processing, as well as the number of chips of the local reference signal. At a minimum, the block size should be the maximum of these two numbers. With this minimum, correlation errors due to circular convolution and partial correlation will occur. To eliminate errors of this nature, the block size is increased to a minimum of the sum of number of chips of the received signal and the number of chips of the reference signal desired for the correlation. For example, if the despreader is to correlate 64 chips of the received signal against 16 chips of the local reference, the minimum block size is 64 chips, while the minimum block size to prevent circular convolution and partial correlation errors is 80 chips. Additionally, when the block size is extended beyond the minimum required for the purpose of prevent said errors, successive blocks are formed from overlapping sections of the received signal. The minimum overlap is equal to the amount of extension to the minimum block size. For the previous example, the minimum overlap is 16 chips. Overlaps of fewer chips result in errors due to circular convolution and partial correlation, while overlaps of more chips results in redundant processing.

Windowing block 54 improves the systems ability to excise narrow band interference. Windowing block 54 may take the form of well-known hamming or blackmann-type window function blocks. The selection of the windowing function is selected based upon the spectrum of the expected interference. The better the frequency domain of the window function matches the narrow band interference spectrum, the better the system will excise the signal.

In a preferred embodiment no windowing is performed and the output of buffer 52 is directly coupled to pad block 55. This embodiment reduces the complexity of the despreader, while continuing to provide for significant interference rejection capability.

The output of windowing block 24 is supplied to pad block 55 which is coupled to FFT 56. Pad block 55 appends zero valued samples to the windowed samples generated by windowing block 24 so that the total of the number of samples in the windowing block and the padded samples equals the FFT size of FFT block 56. One skilled in the art would recognize that the appending of zeros can occur before, after or both before and after the windowed samples. For example, if the windowing block provides 100 samples, and FFT block 56 is set to 256 bins, 156 samples with value zero would be appended to the 100 samples.

The output of pad block 55 is supplied to an input of FFT block 56 for performing a fast Fourier transform on its input data. Accordingly, FFT block 56 provides at its output the frequency domain representation of the down converted signal from tuner 50. FFT block 56 provides a number of frequency bins, which are a function of the FFT length, whereby if L is the FFT length, then L frequency bins are provided.

For each frequency bin supplied from FFT block 56, arctan2 block 58 and complex block 60 are used to normalize each magnitude bin to a constant while preserving the phase information where blocks 56 and 58 are identical to blocks 28 and 30 of FIG. 2.

Figure 4:
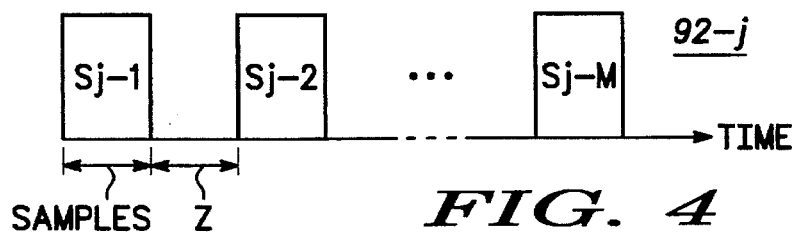
FIG. 4 is a graph which illustrates the time division multiplexing of different spreading sequences as performed by the combine and pad block of FIG. 3.

The output of block 60, representing the whitened input spectrum, is coupled to a plurality of multipliers, represented by multipliers 70-1 through 70-N. Each of these multipliers multiplies the whitened input spectrum by the frequency domain of a time multiplexed series of spreading sequences Sj-1 through Sj-M, where j is the channel number 1 through N. The frequency domain sequence is generated by inputting M sequences Sj-1 through Sj-M to combine and pad block 74. Combine and pad block 74 time multiplexes the M sequences with zero padding in between to generate a TDM sequence 92-j as shown in detail in FIG. 4. In particular, FIG. 4 illustrates combine and pad block 74 receiving Sj-1 through Sj-M sequences and outputting sequence Sj-1, followed by z 0 valued samples, followed by Sj-2 and z 0 valued samples, where z is the number of zero valued samples inserted between sequences Sj-i and Sj-(i+1) This is repeated until Sj-M is output followed by the number of zeros required for the combined output to have a length equal to the length of FFT 56. One skilled in the art would recognize that the order and absolute position of sequences Sj-1 through Sj-M is not important. If desired, zero valued samples can be inserted before the first sequence and the order of the sequences on the output can be changed. The number of zero bits,z, is equal to or greater than the samples represented in the sequence Sj-i. For example, if 64 samples of code phase are to be output, for a sequence which is 128 samples long, and 64 sequences are to be correlated, and a FFT size of 16384 is used, the output could consist of 128 sequence samples, followed by 128 zero valued samples, repeated 64 times. Alternatively the output which corresponds to the minimum spacing between sequences could be 128 sequence samples, followed by 64 zero valued samples, repeated 64 times followed by 4096 zero valued samples.

The outputs of combine and pad blocks 74-1 through 74-N are provided to FFT block 72-1 through 72-N, respectively. The frequency domain of the multiplexed sequences is provided to multipliers 70-1 through 70-N which compute the product of the output of FFT block 72-1 through 72-N and the output of complex block 60.

The output of multipliers 72-1 through 72-N are provided to inverse FFT (IFFT) blocks 76-1 through 76-N respectively for calculating the inverse fast Fourier thereof. The length of the inverse FFT is equal to the length of the FFT computed in FFT block 56. Accordingly, this now provides a despread time domain signal. This despread time domain signal includes valid time bins which include correlation values and invalid time bins containing circular convolution data and/or correlation with more than one sequence. One skilled in the art can readily determine the valid time bins which contain only convolution data based upon the output of tuner 50 and a single sequence.

In addition, these bins have non-uniform magnitude due to the windowing performed by windowing block 54. Window scaling block 78-1 through 78-N performs the necessary scaling to normalize these magnitudes and prevent an amplitude modulation response at the output of the despreader as due to windowing block 54.

In an alternate embodiment which performs no windowing and is implemented without windowing block 54 as previously described, window scaling blocks 78-1 through 78-N are not needed and IFFT blocks 76-1 through 76-N are directed coupled to buffers 80-1 through 80-N respectively.

Finally, the output of window scaling 78-1 through 78-N is passed through buffer and separate blocks 80-1 through 80-N before being output. Buffer and separate blocks 80-1 through 80-N are used to permit the processing of the despread signal to be performed at a different clock frequencies used to discard invalid time bins so that only valid time bins are processed, and to separate the time bins into the separate channels corresponding to the different spreading sequences Sj-1 through Sj-M. This separation is the inverse of the time division multiplexing performed in combine and pad blocks 74-1 through 74-N. The input to the buffer and separate block will consist of a series of valid bins corresponding to one sequence, followed by invalid bins, followed by valid bins of the next sequence, and so forth.

One of ordinary skill in the art should understand that the despreader shown in FIG. 3 is a multichannel frequency domain implementation of an adaptive matched filter which processes multiple spreading sequences using one matched filter with a very fast response whitening function as provided by arctan2 block 58 and complex block 60. This permits the despreader to operate in the presence of large, non-stationary narrow band interference. This implementation is capable of adapting its filter function for every FFT frame which in a preferred embodiment is a single bit period. Using a single FFT to process multiple spreading channels reduces the number of FFT's and IFFT's to process all the channels. For example, if 256 channels of 64 samples of correlation each are required with 64 code phase samples, two 32K-point FFT's and one 32K-point IFFT may be used, rather than 257 64-point FFT's and 256 64 point IFFT's, as would be required in the embodiment of FIG. 2. The choice of the embodiment and the size of the FFT's is typically selected based upon the availability of FFT chips and/or chip sets at different sizes.

The output of the despreader shown in FIG. 3 is a plurality of despread channels. Each despread channel provides multiple code phase correlation outputs. This makes the despreader well suited for post processing by a RAKE receiver for optimally combining the energy from each of the code taps. The number of fingers on a RAKE receiver using this invention is typically greater than that used for adapting to a mobile environment. This is due the additional dispersion induced by the whitening function. The multiple despread channels represent received signals from multiple users and/or multiple code sets from the same users such as the walsh code that is used by a IS-95 portable radio uplink.

By now it should be apparent from the foregoing discussion that a novel receiver has been provided for performing rapid adaptive interference canceling for use in despreading multiple CDMA channels sharing the same RF front end. The receiver includes a buffer for providing for overlapping time samples and rate adaptation, a windowing function for improving interference rejection capability and a FFT for calculating the input power spectrum. The receiver further includes a circuit to whiten the input power spectrum. The whitened power spectrum is multiplied against the frequency domain version of different spreading sequences and the inverse FFT of the product is performed. The output of this inverse FFT is buffered to provide multiple despread output channels, with a plurality of code phases for further processing.

While the invention has been described in specific embodiments thereof, it is evident that many alternations, modification and improvements may be apparent to those of ordinary skill in the art. Accordingly, it is intended that all such alternations, modifications, and variations fall within the broad scope of the appended claims.

What is claimed is:

1. An adaptive interference canceler despreader for despreading an input multiple code division multiple access (CDMA) signal generated from a spreading code and supplied at an input whereby the input CDMA signal may include interference due to one or more narrow band signals, the adaptive interference canceler despreader comprising:

Fourier transform means for generating the Fourier transform of the input CDMA signal supplied at the input, thereby generating a frequency domain version of the CDMA signal;

means for normalizing the magnitude of the frequency domain version of the CDMA signal while preserving its phase information, thereby performing a whitening function on the frequency domain version of the CDMA signal and adapting to changes in interference;

means for generating a frequency domain version of a plurality of spreading sequences of the spreading code;

means for multiplying the normalized frequency domain version of the CDMA signal by the plurality of spreading sequences of the frequency domain version of the spreading code, thereby generating a plurality of despread signals; and inverse Fourier transform means for determining the inverse Fourier transform of the plurality of despread signals, thereby providing a time domain version of the plurality of despread signals.

2. The adaptive interference canceler despreader of claim 1 further including:

window means, coupled between the input and the Fourier Transform means, for implementing a window function on the input CDMA signal, thereby improving the despreader's ability to excise narrow band interference; and scaling means, coupled to the inverse Fourier transform means, for performing window scaling on the plurality of despread signals, thereby preventing an amplitude modulation response from appearing within the plurality of despread signals due to a non-uniform magnitude caused by the window means.

3. The adaptive interference canceler despreader of claim 2 further including:

first buffer means, coupled between the input and the window means, for providing rate adaptation between the rate of the Fourier transform means and other post processing and for providing overlapping time samples to the window means; and second buffer means, coupled to the scaling means, for allowing the plurality of despread signals to be processed at different clock frequencies.

4. The adaptive interference canceler despreader of claim 3 further including:

tuner means, coupled between the input and the first buffer means, for downconverting a carrier frequency associated with the input CDMA signal.

5. The adaptive interference canceler despreader of claim 1 wherein the means for generating a frequency domain version of a plurality of spreading sequences of the spreading code includes:

means for zero padding each of the plurality of spreading sequences; and means for calculating the Fourier transform of the padded plurality of spreading sequences, wherein the means for zero padding ensures that the length of the Fourier transform of the spreading sequence is the same as the length of the Fourier transform of the input CDMA signal.

6. The adaptive interference canceler despreader of claim 1 wherein the means for generating a frequency domain version of a plurality of spreading sequences of the spreading code includes:

means for multiplexing the plurality of spreading sequences and zero padding in between each of the plurality of spreading sequences thereby generating a time multiplexed series of spreading sequences; and means for calculating the Fourier transform of the time multiplexed series of spreading sequences, wherein the zero padding between each of the plurality of spreading sequences ensures that the length of the Fourier transform of the time multiplexed series of spreading sequences is the same as the length of the Fourier transform of the input CDMA.

7. A method for despreading an input multiple code division multiple access (CDMA) signal generated from a spreading code, the method having the capability of adaptively cancel interference due to one or more narrow band signals, the method comprising the steps of:

generating a Fourier transform of the CDMA signal, thereby generating a frequency domain version of the CDMA signal;

normalizing the magnitude of the frequency domain version of the CDMA signal while preserving its phase information, thereby performing a whitening function on the frequency domain version of the CDMA signal and adapting to changes in interference;

generating a frequency domain version of at least one of a plurality of spreading sequences of the spreading code;

multiplying the normalized frequency domain version of the CDMA signal by the at least one of the plurality of spreading sequences of the frequency domain version of the spreading code, thereby generating at least one despread signal; and generating an inverse Fourier transform of the at least one despread signal, thereby providing a time domain version of the at least one despread signal.

8. The method of claim 7 further including the step of implementing a window function on the input CDMA signal, thereby improving the ability to excise narrow band interference.

9. The method of claim 7 further including the step of downconverting a carrier frequency associated with the input CDMA signal.

10. The method of claim 7 wherein the step of generating a frequency domain version of the at least one of the plurality of spreading sequences of the spreading code includes the steps of:

zero padding the at least one of the plurality of spreading sequences; and calculating the Fourier transform of the at least one zero padded spreading sequences, thereby ensuring that the length of the Fourier transform of the at least one of the spreading sequences is the same as the length of the Fourier transform of the input CDMA signal.

11. An adaptive interference canceler despreader for despreading an input multiple code division multiple access (CDMA) signal generated from a spreading code and supplied at an input whereby the input CDMA signal may include interference due to one or more narrow band signals, the adaptive interference canceler despreader comprising:

a first fast Fourier transform (FFT) for generating the Fourier transform of the input CDMA signal supplied at the input, thereby generating a frequency domain version of the CDMA signal;

normalization means for normalizing the magnitude of the frequency domain version of the CDMA signal while preserving its phase information, thereby performing a whitening function on the frequency domain version of the CDMA signal and adapting to changes in interference;

a second FFT for generating a frequency domain version of at least one of a plurality of spreading sequences of the spreading code;

at least one multiplier for multiplying the normalized frequency domain version of the CDMA signal by the at least of the plurality of spreading sequences of the frequency domain version of the spreading code, thereby generating at least one despread signal; and an inverse fast Fourier transform for determining the inverse Fourier transform of the at least one despread signal, thereby providing a time domain version of the at least one despread signal.

12. The adaptive interference canceler despreader of claim 11 further including:

a window circuit, coupled between the input and the first FFT, for implementing a window function on the input CDMA signal, thereby improving the despreader's ability to excise narrow band interference; and a scaling circuit, coupled to the inverse fast Fourier transform means, for performing window scaling on the at least one despread signal, thereby preventing an amplitude modulation response from appearing within the at least one despread signal due to a non-uniform magnitude caused by the window circuit.

13. The adaptive interference canceler despreader of claim 12 further including:

a first buffer, coupled between the input and the window circuit, for providing rate adaptation between the rate of the first FFT and other post processing and for providing overlapping time samples to the window circuit; and a second buffer, coupled to the scaling circuit, for allowing the at least one despread signal to be processed at different clock frequencies.

14. The adaptive interference canceler despreader of claim 13 further including:

a tuner, coupled between the input and the first buffer, for downconverting a carrier frequency associated with the input CDMA signal.

15. The adaptive interference canceler despreader of claim 14 wherein the second FFT includes a zero padding circuit for padding the at least one of the plurality of sequences of the spreading code with zeroes thereby ensuring that the length of the Fourier transform of the spreading sequence is the same as the length of the Fourier transform of the input CDMA signal.

* * * * *